UNITED STATES PATENT OFFICE.

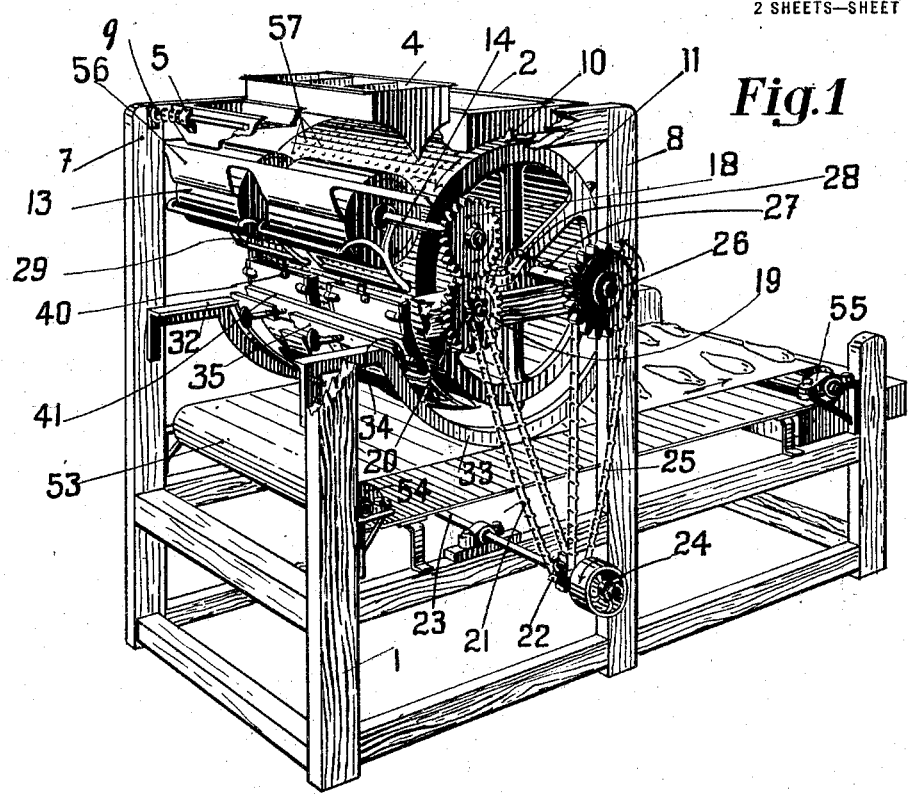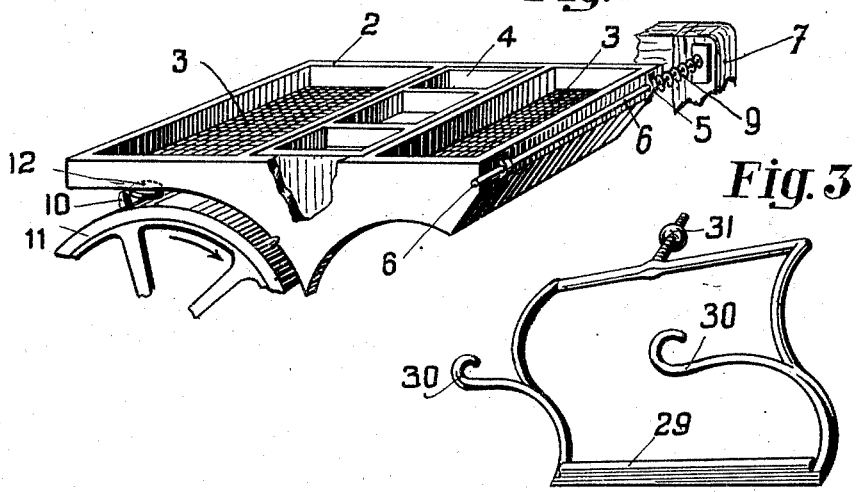

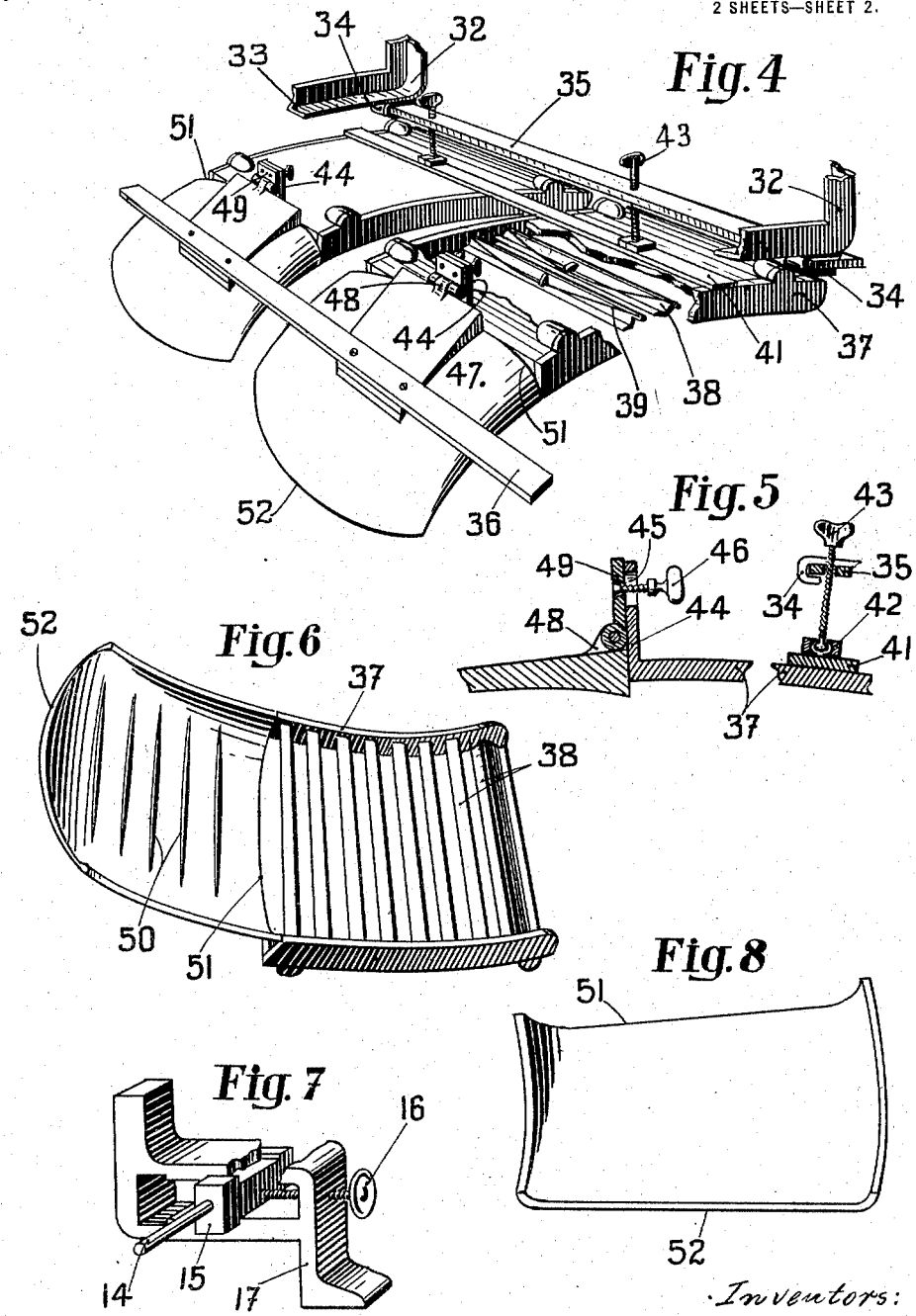

JUAN BALCELLS AND JUAN SERVITJE, OF MEXICO, MEXICO.

PANNING-MACHINE.

1,308,216.  Specification of Letters Patent.  Patented July 1, 1919.

Application filed November 1, 1918. Serial No. 260,639.

*To all whom it may concern:*

Be it known that we, JUAN BALCELLS and JUAN SERVITJE, subjects of the King of Spain, residing at Mexico, Federal District, Mexico, have invented certain new and useful Improvements in Panning-Machines; and we do declare the following to be a clear, full, and exact description of the same, reference being had to the accompanying drawings, and to the characters of reference marked thereon, which form a part of this application.

This invention refers to dough curling and molding machines and the object thereof is to provide a machine which will take charge of the divided dough, giving the necessary curling and rolling to the pieces of dough and thereupon molding them into the required form for French rolls and loaves, under a further rolling and slight successively increasing squeezing.

Although this panning machine will be useful for making loaves, it is especially designed for turning out pieces of dough properly molded into rolls, ready for the subsequent baking without any manipulating by hand and without necessitating the use of a bread pan.

One of the objects of this invention is, to subject the pieces of dough to only the required degree of kneading, curling and molding, avoiding excessive manipulation of the dough which would destroy the conditions of the dough, and to insure an exact and uniform size of all the pieces.

Another object of the invention is to provide a simple latch device whereby different sizes of curlers and molders may be rapidly applied to the machine, which will still serve for various sized and formed panning.

Figure 1 is a perspective view of the machine, parts being broken away for clearness of illustration.

Fig. 2, a perspective view of the flour sifter.

Fig. 3, a perspective view of the hanging counterweighted folder, the weight being omitted from Fig. 1 to avoid obscuring the parts disposed directly behind it.

Fig. 4, a bottom perspective view of the resilient curler and hinged molder.

Fig. 5, a side view of the same.

Fig. 6, a perspective front view of the curler and molder.

Fig. 7, a perspective view of the adjustable supporting block.

Fig. 8, a perspective view of a loaf molder.

Referring more particularly to the drawings: (1) is the wooden frame on top of which is set the flour sifting vessel (2) both end compartments of which are provided with net-work (3), the middle compartment thereof being occupied by the removable hoppers (4) into which the divided dough is charged. The vessel (2) is sustained at one end, by braces (5) on a rod (6) conveniently resting in and between the uprights (7) of the framework (1), and at the opposite end on top of a cross girder, not shown, which connects the upper ends of the uprights (8). A spiral spring (9) is placed on the rod (6) between the upright (7) and one of the braces (5), holding the vessel (2) normally against the pins (10) which project radially from the drum (11). A roller (12) on the vessel charges or compresses the spring (9) when any of the pins pass along at the rotation of the drum (11), whereby a transverse reciprocating movement of the vessel is obtained and flour sifted down onto the drum and rollers (13).

Two rollers (13) are removably fastened to the shaft (14) rotating in the bearing blocks (15), which are adjusted by the set screws (16) in the brackets (17) attached to the frame-work (1). One end of the shaft (14) has a gear wheel (18) meshed with the gear wheel (19) connected to a small sprocket (20), driven by the chain (21) from the sprocket (22) on the main shaft (23) having the pulley (24) to which motion is transmitted from a suitable source of power. Another chain (25) transmits movement to the sprocket (26) on the drum shaft (27) which rotates in the block bearings (28).

In Fig. 3, a folder (29) is provided with hook extensions (30) which engage the roller shaft (14), and suspend the folder therefrom, the said folder being also provided with an adjustable weight (31), the latter, as previously stated, being omitted from Fig. 1 to prevent it from obscuring the parts directly behind it.

Between the uprights (7) and (8) are mounted the angle irons (32), the middle portions (33) of which are bent into semicircles having projecting hook portions (34) for the reception of the curler latch bar (35), and similar hook portions, though not shown, for the support of the molder latch bar (36). The curler comprises a curved pan (37) in which a number of angular sheet metal strips (38) are mounted on curved spring wires (39), while on the back of the pan a stop or bumper (40) is riveted for limiting the swinging movement of the folder (29). In the construction illustrated, the machine comprises a double set of curlers and molders, and the two curlers are spanned together by the connecting bar (41) on which socket bearings (42) are attached. Set screws (43) provided with wing nuts engage the latch bar (35) while the spherical lower ends of the screws are held in the spherical openings or sockets of the bearings, making possible an adjustment of the curlers in relation to the drum (11).

From the lower end of the pan (37) projects at a right angle a knee (44) having slots (45) wherein the adjusting screws (46) slide. The molders (47) are scoop shaped, and from the rear end of each extends a hinge (48), the leaf (49) of which is engaged by the adjusting screws (46). The two molders (47) are connected by the latch bar (36) and the inside of the scoop shaped molders have parallelly distributed ridges (50). The upper end (51) of the molder where the dough pieces enter is deeper than the shallower end (52), where they issue.

In Fig. 8 is shown a loaf molder and it will be observed that it is only curved in one direction, while the molders for making rolls are curved in cross directions so as to form the dough into tapered pieces.

A conveyer belt (53) passes over the rollers (54) conveniently supported and rotated in the bearings (55) by transmission connections, not shown, from the main shaft (23).

Scrapers (56) are conveniently attached in front of the rollers (13) and the surface of the drum is provided with round embossments (57).

When the machine is operated by revolving the pulley (24) in the direction shown by the arrow, dough pieces of the proper weight are supplied to the hoppers (4) from which they fall on to the drum, which is properly dusted with flour from the vessel (2). The pieces of dough then come into contact with the rollers (13) and are rolled out into the shape of tongues and when following the course of the drum, although not sticking thereto owing to its embossments, the tips of these tongues of dough will strike the folders (29) which obstruct the passage, but as the counter-weights of the folders are exactly adjusted, the folders will be pushed outward out against the stop (40). During this time, the advancing tips of the pieces of dough are folded backward upon themselves and are made to project away from the drum, so that the central portions of the pieces of dough proceed foremost. Thereafter, the pieces of dough are caused to roll over the springy strips of the curlers, and when they reach the molders they still curl, but whereas the molders diminish in depth the pieces of dough are compressed and extend themselves toward the edges of the scoops where the latter are shallower, and consequently taper the dough into the form required for rolls.

From the molders the molded pieces of dough fall onto the conveyer (53) shown in Fig. 1.

Having thus fully described our invention what we claim is:

1. A panning machine comprising a drum having embossments, adjustable rollers coöperating with said drum to extend pieces of dough into tongues, a swinging folder on the roller shaft, an adjustable curved curler pan over which the folded tongues are rolled, and an adjustable curved molder adapted to receive the curled tongues of dough and gradually compress them toward its delivery end.

2. A panning machine comprising a drum having upwardly projecting embossments on its circumference, adjustable rollers coöperating with said drum and disposed in front thereof, a swinging folder on the shaft of said rollers, a support projecting from said folder and provided with an adjustable counter-weight, a stop to limit the swinging movement of said folder and cause it to fold over the advancing piece of dough, after which the folder may swing back to its initial position ready for folding the next piece of dough, and a device to receive and mold the folded pieces of dough.

3. A panning machine comprising a drum with an embossed circumference, adjustable rollers coöperating with said drum, a folder, and an adjustable curved curling pan receiving the folded tongues of dough from the folder, said pan having resilient ribs mounted therein in parallel relation and longitudinally with respect to the axis of said drum.

4. A panning machine comprising a drum with an embossed circumference, adjustable rollers coöperating with said drum, a swinging folder, an adjustable curved curling pan provided with resilient ribs, and a scoop shaped molder provided with ridges adjustably hinged to said curling pan, the edge of said molder over which the pieces of curled dough are discharged being shallower than the edge adjoining the curling pan.

5. In a panning machine, the combination of means for folding over the pieces of dough upon themselves, and an adjustable scoop shaped curved molder to receive the folded pieces of dough and over which they are rolled and slightly compressed.

6. A panning machine comprising a reciprocating flour sifter and an embossed drum, a pair of coöperating adjustable rollers, a pair of swinging counterweighted folders, a pair of adjustable curved curling pans provided with elastic ribs, a scoop shaped ridged molder adjustably hinged to each curling pan, and a conveyer belt to receive the molded pieces of dough.

In testimony whereof we have affixed our signatures.

J. BALCELLS.
J. SERVITJE.

Copies of this patent may be obtained for five cents each, by addressing the "Commissioner of Patents, Washington, D. C."